(No Model.) 2 Sheets—Sheet 1.
G. H. NEUHAUSS, J. F. H. GRONWALD & E. H. C. OEHLMANN.
STERILIZING APPARATUS.
No. 455,925.  Fig. 1.  Patented July 14, 1891.
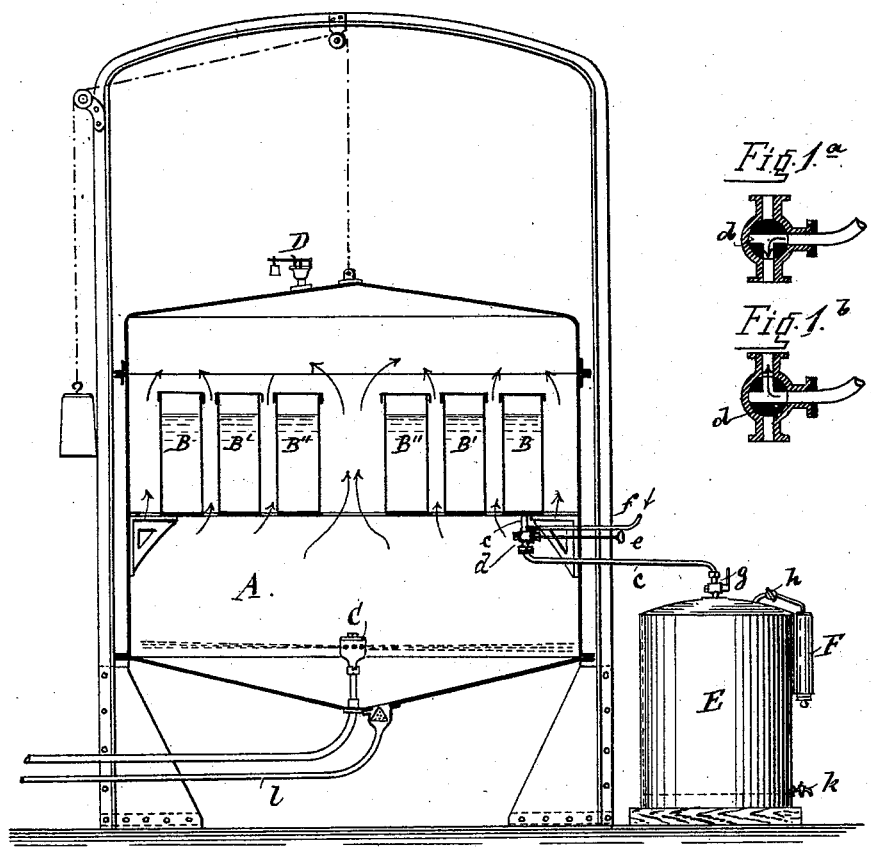
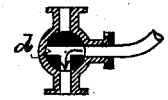
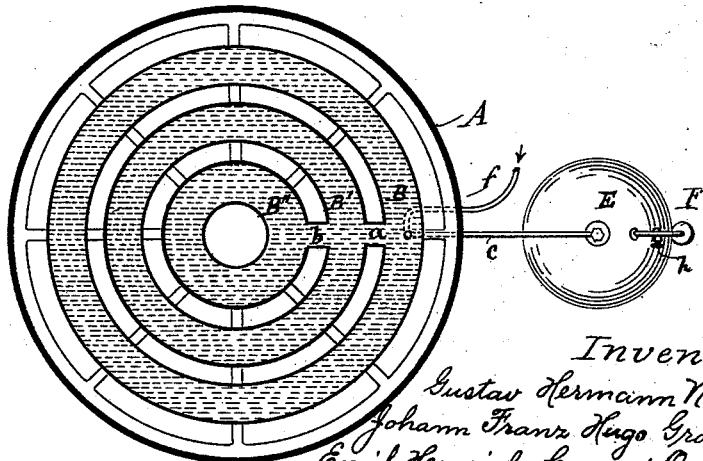
Fig. 2.
Witnesses:
E. L. Richards
Inventors:
Gustav Hermann Neuhauss,
Johann Franz Hugo Gronwald,
Emil Heinrich Conrad Oehlmann.
By Richards
Attorneys.
THE NORRIS PETERS CO., PHOTO-LITHO., WASHINGTON, D. C.

(No Model.) 2 Sheets—Sheet 2.

G. H. NEUHAUSS, J. F. H. GRONWALD & E. H. C. OEHLMANN.
STERILIZING APPARATUS.

No. 455,925. Patented July 14, 1891.

Witnesses:
E. L. Richards
C. Sedgwick

Inventors:
Gustav Hermann Neuhauss,
Johann Frank Hugo Gronwald
Emil Heinrich Conrad Oehlmann
By Richards
Attorneys.

UNITED STATES PATENT OFFICE.

GUSTAV HERMANN NEUHAUSS, JOHANN FRANZ HUGO GRONWALD, AND EMIL HEINRICH CONRAD OEHLMANN, OF BERLIN, GERMANY.

STERILIZING APPARATUS.

SPECIFICATION forming part of Letters Patent No. 455,925, dated July 14, 1891.

Application filed October 21, 1890. Serial No. 368,819. (No model.)

*To all whom it may concern:*

Be it known that we, GUSTAV HERMANN NEUHAUSS, JOHANN FRANZ HUGO GRONWALD, and EMIL HEINRICH CONRAD OEHLMANN, residents of the city of Berlin, Germany, and subjects of the Emperor of Germany, have invented certain new and useful Improvements in Sterilizing Apparatus, of which the following is a full, clear, and exact description.

The object of the present invention is an apparatus for the rapid and perfect sterilization of large quantities of milk or other liquids, and the subsequent drawing off of the sterilized liquid by vacuum, to the exclusion of air, into specially-treated shipping-cans.

This sterilizer is distinguished by the use of one or more peculiar sterilizing vessels or chambers which are connected with one or more shipping or storage cans and which are arranged within the apparatus. They are so shaped relatively as to divide the liquid to be treated in thin bodies, and thus present by offering a relatively large heating-surface the smallest possible diameter or breadth—that is, to form passages of any shape to receive the liquid to be treated, so that the sterilization of large quantities can take place as rapidly and as perfectly as possible, so that, for example, the milk while being sterilized is not exposed to the danger of being burned or scorched, and besides that the sterilized liquid can be drawn off into the shipping-cans while air is excluded from said cans.

Figure 3:
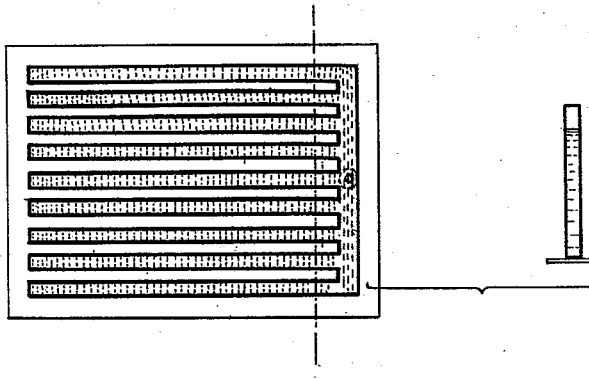
Figure 4:
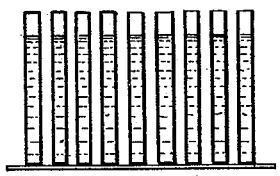

In the accompanying drawings, forming a part of this specification, Figures 1 and 2 show the new apparatus in section and plan with application of ring-shaped concentrically-disposed sterilizing-chambers. Figs. 3 and 4 show a modification of the sterilizing-chambers, they being arranged to run parallel. Figs. 5 to 8 are sectional views illustrating different embodiments of our invention, which will be hereinafter described in detail.

In both modes of construction, which are advantageously adapted for the sterilization of milk, the ring-shaped or parallel sterilizing-chambers are connected with each other by open passages formed by the walls of these chambers; but in the forms of construction shown in Figs. 5, 6, 7, and 8 the connection of the steam or heating chambers is made by exterior pipes or tubes.

The ring-shaped sterilizing-chambers B B' B'' are arranged in the heating-space A, Fig. 1, so that they are surrounded on all sides by the steam issuing from nozzle C. The steam used for sterilization escapes by valve D whenever it is opened from heating-chamber A. The connection between the sterilizing-chamber B with B' and B' with B'' is formed by passages $a$ $b$, Fig. 2. B is fitted out with a discharge-pipe $c$, in which a valve or cock $d$ is inserted, Figs. $1^a$ $1^b$, which can be worked from the outside by handle $e$. In the present method of construction the closing-valve $d$ consists of a three-way cock, Figs. $1^a$ $1^b$, which, on the one hand, forms the connection through pipe $c$ between the sterilizing-chamber B and the shipping-can E, which is outside the heating-chamber, and, on the other hand, it effects the admission of steam by pipes $f$ and $c$ to the shipping-can E. At the bottom of the heating-chamber A a conductor $l$ is arranged to lead off the water of condensation.

The operation of the apparatus is as follows: The liquid which is to be sterilized—for example, milk—is poured into one of the chambers, say B, and is distributed through canals $a$ and $b$ into the other chambers B' B''. The milk is only filled in to such a depth that boiling over cannot take place. It is advisable to cover the milk in the sterilizing-chambers with light covers to prevent the admission of any water of condensation which may drop from the top of the heating-chamber. After the sterilizing-chambers are supplied with milk and heating-chamber A is closed, at which time the connection between sterilizing-chamber B and shipping-can E must be closed, steam is admitted into heating-chamber A by nozzle C and allowed to flow through the interior of the apparatus until the milk in the sterilizing-chambers is sterilized. Before this, or at the same time, steam is forced through shipping-can E by the cocks $d$, $g$, and $k$, and through filter F and cock $h$, which is continued until the conductor $c$, the shipping-can E, and air-filter F are sterilized. As soon as shipping-can E, with its air-filter F and conductor c, is sterilized, cocks d, g, h, and k are closed and the steam contained in shipping-can E is condensed, thereby forming a vacuum in the inside of the can. By the proper turning of the three-way cock d the communication between sterilizing-chamber B and shipping-can E is established, and the sterilized milk is drawn over without the admission of air.

Figure 5:
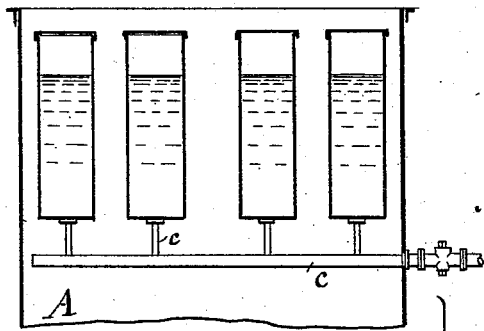
Figure 6:
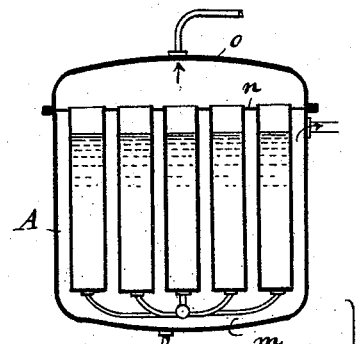

The same operation is performed in the constructions shown in Figs. 3, 4, 5, and 6, only the connection of the different sterilizing-chambers, Figs. 5 and 6, is formed by a conductor outside of the milk-chamber proper.

Figure 7:
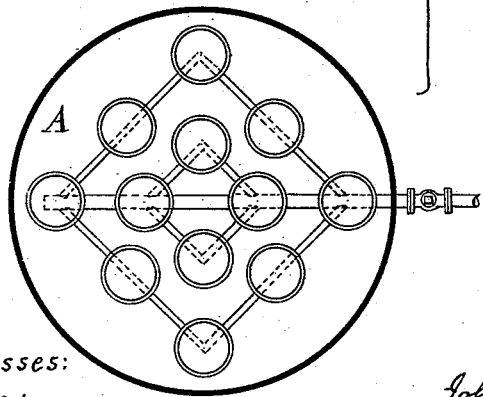
Figure 8:
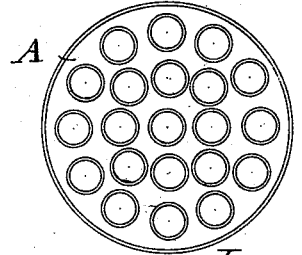

In the previously-described constructions the sterilizing-chambers are surrounded on all sides by the sterilizing-steam. In Figs. 7 and 8 a construction is shown in which the sterilizing-chambers are only partly surrounded with steam. Here, also, the connection of the separate chambers can be made by interior or exterior canals. The sterilizing-chambers are open at the top here also. They are, however, separated lower down in the intervening spaces toward the steam-space m by a partition n and they open into space o. The steam surrounds the sterilizing-chambers then and brings the milk to the desired temperature. The gas and vapors rising from the milk during this process flow into space o and are led off. They cannot thus mix with the sterilizing-steam. The drawing off of the sterilized milk is done in the same manner as previously described.

The advantages of the above construction consist principally in presenting large heating-surfaces to the action of the steam flowing through, and the use of sterilizing-chambers, whose inner spaces are kept as narrow as possible.

The sterilizing process can take place with large quantities of liquid through its division in thin layers so quickly and with such certainty that—with milk, for example—all danger of burning is excluded.

It is understood that the form chosen for the sterilizing-chambers is such as to favor their being kept clean. Should it be desirable to cool the liquid treated in the apparatus before it reaches the shipping-cans, it would only be necessary to apply a cooling apparatus to conductor c.

What we claim is—

1. A sterilizing apparatus consisting of an outer steam-tight casing having a steam-inlet, two or more closed chambers arranged within the casing and connected to each other by ducts, an air-tight shipping or storing vessel provided with a cock or cocks and connected with one of the chambers by a pipe fitted with a three-way cock, and a steam-pipe leading to said three-way cock, all substantially as described, whereby the shipping-vessel may be sterilized by live steam and the milk be afterward drawn thereto owing to the forming of a vacuum by the condensation of the steam.

2. The combination, substantially as described, of the casing, the connected sterilizing-chambers, one of which is connected with shipping-can E by a pipe c, the three-way cock in said pipe, the steam-pipe f, leading to said cock, the cocks g and k, and an air-filter F, connected with can E by a pipe having a cock h.

In witness whereof we have hereunto set our hands in presence of two witnesses.

GUSTAV HERMANN NEUHAUSS.
JOHANN FRANZ HUGO GRONWALD.
EMIL HEINRICH CONRAD OEHLMANN.

Witnesses:
ALEX. SCHOLZE,
GOTTFRIED NIEMÖLLER,